United States Patent [19]
Sell

[11] Patent Number: 5,929,532
[45] Date of Patent: Jul. 27, 1999

[54] METHOD AND APPARATUS FOR CONTROLLING ELECTRICAL POWER SUPPLIED TO A TRAILER ABS CONTROL UNIT AND TO AN AUXILIARY CIRCUIT RESPONSIVE TO EMERGENCY AIR BRAKE SUPPLY LINE PRESSURE

[75] Inventor: Edward D. Sell, Iola, Kans.

[73] Assignee: TRAMEC Corporation, Iola, Kans.

[21] Appl. No.: 09/012,239

[22] Filed: Jan. 23, 1998

[51] Int. Cl.[6] ........................................... B60L 1/00
[52] U.S. Cl. ...................... 307/9.1; 307/118; 303/DIG. 3
[58] Field of Search .................... 307/9.1, 10.1, 307/10.8, 116, 118; 280/DIG. 14; 303/123, 138, DIG. 3; 701/36, 70–81; 439/34–36

[56] References Cited

U.S. PATENT DOCUMENTS 5,263,771  11/1993  Smith ...................................... 303/123

Primary Examiner—Richard T. Elms
Attorney, Agent, or Firm—Dowell & Dowell, P.C

[57] ABSTRACT

A method and apparatus for permitting use of an ABS electrical power circuit associated with a tractor-trailer vehicle to provide auxiliary power whenever the trailer is parked and which provides for full power to an ABS brake control circuit through the ABS electrical power circuit in response to air pressure in the emergency brake supply line of the tractor-trailer vehicle being above a predetermined minimum which is sufficient to release the trailer's emergency brake and permit movement of the trailer.

8 Claims, 2 Drawing Sheets

METHOD AND APPARATUS FOR CONTROLLING ELECTRICAL POWER SUPPLIED TO A TRAILER ABS CONTROL UNIT AND TO AN AUXILIARY CIRCUIT RESPONSIVE TO EMERGENCY AIR BRAKE SUPPLY LINE PRESSURE

CROSS REFERENCES TO RELATED APPLICATIONS

STATEMENT AS TO RIGHTS TO INVENTIONS MADE UNDER FEDERALLY SPONSORED RESEARCH AND DEVELOPMENT

BACKGROUND OF THE INVENTION

The present invention is directed to a method and apparatus for permitting use of a dedicated electrical circuit extending between a tractor and a trailer and used to power the trailer's ABS brake control circuit for purposes of providing auxiliary power whenever the trailer is parked and there is no need for the dedication of the electrical circuit to the ABS control circuit. Further, the present invention is also directed to a failsafe method and apparatus for dedicating an electrical circuit to the ABS brake control circuit by terminating power to any auxiliary circuits connected to an electrical input to the ABS control circuit in response to a buildup of pressure in the vehicle's emergency brake air supply system. With the invention, whenever pressure has been increased in the emergency brake air supply system to release the trailer air brakes, a normally closed pneumatic switch automatically opens the auxiliary electrical circuit and ensures a dedicated "hot" wire circuit directly from the tractor to the trailer ABS control circuit.

Electrical power to a trailer pulled by a tractor is provided by connecting the tractor electrical power supply to a number of dedicated electrical circuits associated with the trailer. Conventionally, the trailer includes dedicated circuits for the left-turn signal, right-turn signal, signal markers, taillights, stoplights, the automatic brake system (ABS) control circuit and ground. Tractor-trailer fleets have conventionally used the circuit adapted for use for powering the ABS control circuit for auxiliary applications, such as for providing power to interior lights, whenever the ABS control circuit is not to be utilized, such as when the trailer is parked. However, it is necessary to ensure that the power to the ABS control circuit is available and protected from excess loads which may cause a loss of power to the ABS whenever the trailer is to be moved. Pending federal guidelines will soon require that the trailer be wired "hot" in order to provide continuous power to the trailer ABS control circuit to ensure proper functioning of the computer governing the trailer braking system whenever the trailer is being moved by a tractor.

Conventional trailers are also mandated to receive braking power from the air brake system of a tractor. In this respect, federal guidelines require that the emergency brakes on the trailer be applied whenever there is a decrease in air pressure to a predetermined level in the emergency brake air lines of a tractor-trailer vehicle. Thus, before a trailer can be moved, it is necessary to either manually override the emergency brakes to allow towing of the trailer by an emergency vehicle or to provide sufficient air pressure within the emergency brake lines to release the emergency brakes.

SUMMARY OF THE INVENTION

The present invention is directed to a method and apparatus for allowing the dedicated "hot" wire circuit to an ABS control circuit of a trailer to be tapped as an auxiliary power source whenever the trailer is parked such that the control circuit for the ABS system is not required. The invention is further directed to a method and apparatus for automatically ensuring a complete dedication of the electrical circuit to the ABS control circuit of a trailer wherein an auxiliary circuit connected to the ABS electrical circuit is automatically opened in response to a buildup of pressure in the emergency brake supply lines, thus ensuring that full power is available to the ABS control circuit whenever the pressure within the emergency brake system is sufficient to permit movement of the trailer.

In the preferred embodiment, the present invention incorporates a pneumatic switch which is tapped into the emergency brake air supply line for the trailer. The pneumatic switch includes an input from the input circuit to the ABS control system and an output connected to an auxiliary load, such as auxiliary lights. The pneumatic switch is configured so as to be normally closed whenever the pressure within the emergency brake supply line is below a predetermined minimum such that the emergency brakes of the trailer are applied, thereby preventing movement of the trailer. The pneumatic switch, however, is responsive to a buildup of pressure above the minimum pressure at which the emergency brakes of the trailer are released to automatically open the auxiliary circuit and thereby ensure a completely dedicated electrical circuit from the tractor power source to the ABS brake control circuit of the trailer whenever the trailer emergency brakes are released.

It is the primary object of the present invention to provide a method and apparatus for allowing the electrical power circuit from a tractor to a trailer ABS control circuit to be tapped for auxiliary purposes whenever the trailer is parked such that it is not necessary to provide power to the ABS control circuit, however, which automatically ensure complete dedication of the electrical circuit to the ABS control circuit whenever sufficient pressure is developed within the vehicle emergency brake air supply line to release the emergency brakes of the trailer and permit its movement.

It is yet another object of the present invention to provide a low cost, efficient and failsafe system for ensuring that power is always available to the ABS control circuit when a trailer is in motion.

DESCRIPTION OF THE PREFERRED EMBODIMENTS

Figure 4:
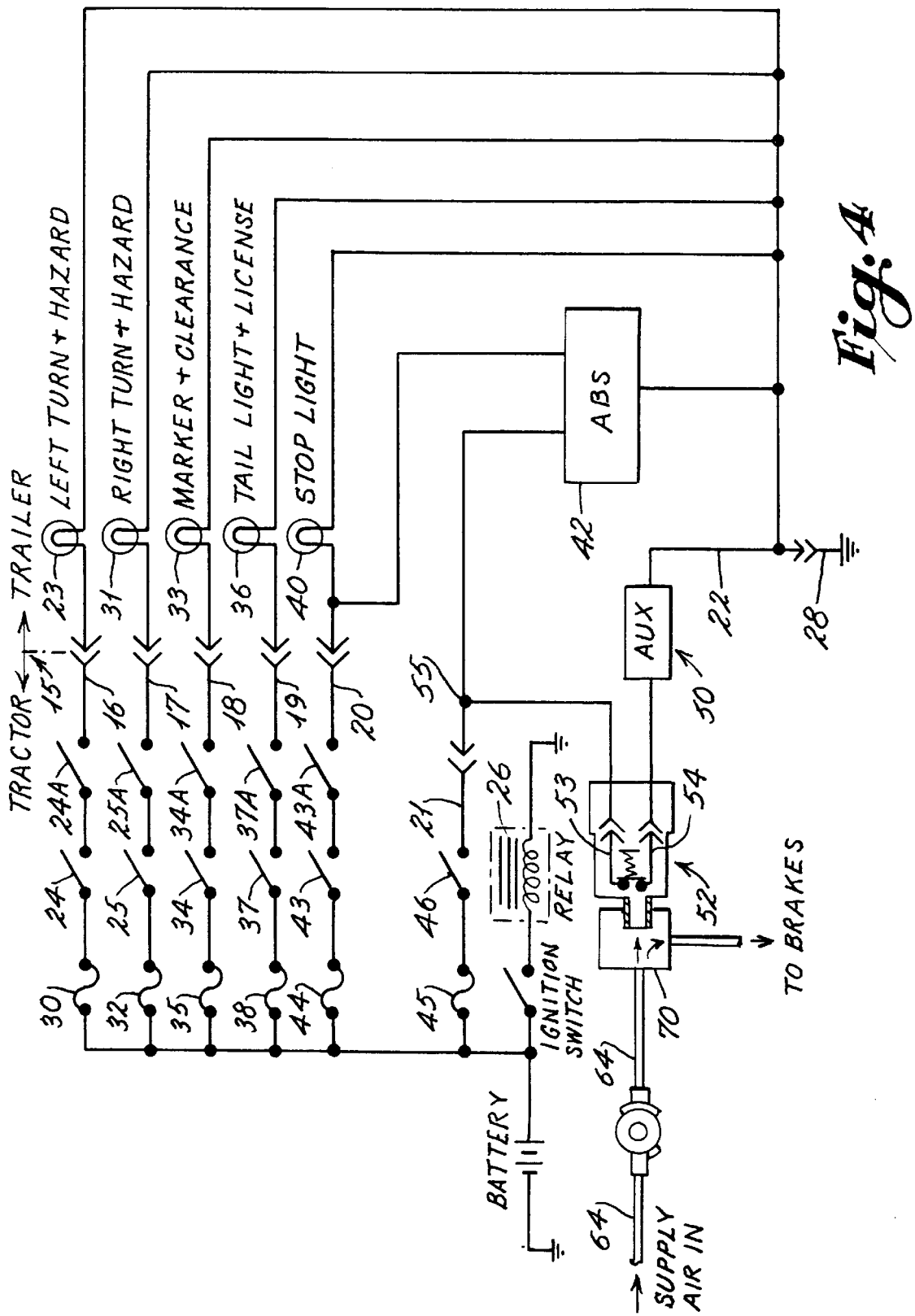
FIG. 4 is an electrical diagram showing the switch of FIGS. 2 and 3 and its relationship with the electrical circuit of the trailer and the auxiliary circuit.

With continued reference to the drawing figures, a vehicle 10 is shown including a tractor 11 and trailer 12. In a conventional manner, the trailer receives electrical power by way of an electrical cable 14 which normally includes specialized electrical connectors or adapters (not shown). In many of the electrical cables currently being used by conventional tractor-trailer vehicles, a total of seven conductors are provided. These conductors or circuits are shown in FIG. 4 with the connector associated with the trailer being generally identified in the circuit diagram at 15. The seven dedicated electrical lines or circuits are identified at 16, 17, 18, 19, 20, 21 and 22. For purposes of general discussion, electrical circuit 16 provides power to the left-turn signal 23 when the driver's switch 24A is closed, and the circuit further includes relay switch 24 which is normally in an OFF position, as shown in the drawing figure, however, is moved to an ON position in response to activation of relay 26 whenever the ignition switch in the tractor is "ON". The ignition switch provides power to the relay 26. Circuit 16 also includes an appropriate fuse 30. Electrical circuit 17 provides power to the right-turn signal 31 and further includes a normally open relay switch 25 which responds in the same manner as relay switch 24 and also includes a fuse 32 and a driver's switch 25A.

Electrical line 18 provides power to the marker lights of the trailer and the circuit further includes relay switch 34 which is activated in a manner similar to the switch 24 and also includes a fuse 35 and driver's switch 34A. Electrical circuit 19 provides power to the taillights 36 and further includes a relay switch 37 which is normally open but which is closed in a manner similar to relay switch 24 and the circuit further includes a fuse 38 and driver's switch 37A. Electrical circuit 20 is connected to the vehicle brake lights or stoplights 40 and to the ABS control circuit 42 so that the ABS may be provided with a backup power source from the stoplight circuit whenever the trailer service brakes are applied. The ABS control circuit 42 includes the necessary computer elements for regulating the application of the trailer brakes. Electrical circuit 20 further includes a relay switch 43 which is normally open and which is activated to a closed position in a manner similar to relay switch 24 and the circuit further includes a fuse element 44 and a stoplight switch 43A which is activated by service brake air pressure. Primary power to the ABS control circuit 42 is provided through electrical circuit 21 by way of fuse element 45. Circuit 21 further includes a normally open relay switch 46 which functions similar to relay switch 24.

When the trailer is in motion, the electrical input circuit 21 must be "hot" and there can be no auxiliary use of this circuit which will cause the electrical power to the ABS control circuit 42 to drop below a level which will ensure proper functioning and control of the trailer braking system. However, when the trailer is to be parked and not in motion, it would be of benefit to utilize the full power available in the circuit 21 to supply energy for auxiliary uses, such as shown at 50, which may be additional lights within the trailer or other uses. Utilizing the ABS input circuit 21 allows normal functioning of the remaining circuits so that power is provided to illuminate the vehicle lighting system in a normal manner, even when the vehicle is parked.

To provide a failsafe method of tapping the ABS electrical input circuit 21 whenever the trailer is parked, the present invention provides a normally closed pneumatic switch 52 having an input 53 and an output 54. Input 53 is connected at 55 to the ABS electrical input circuit 21 and the output 54 is connected through an auxiliary circuit to an auxiliary load 50 which is connected to ground at 28 through grounding circuit 22 and connector 15.

Figure 1:
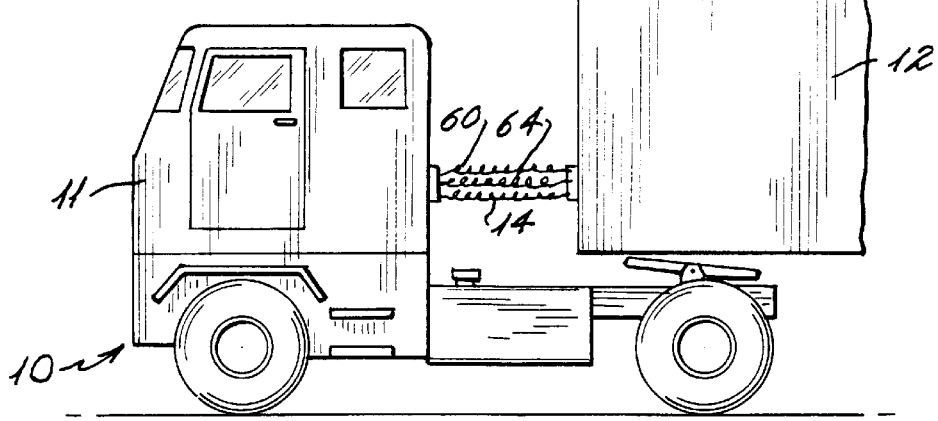
FIG. 1 is a partial illustrational view of a tractor connected to a trailer showing electrical and pneumatic brake lines connection therebetween.

Referencing FIGS. 1 and 4, the trailer 12 receives braking pressure through an air brake system which includes a service or control air line 60 and an emergency supply line 64 which is connected to the emergency brakes of the trailer. Whenever the trailer is parked, the emergency brakes are applied. To release the emergency brakes, sufficient pressure must be developed within the emergency braking system of the vehicle. The pneumatic switch 52 of the present invention is designed to be automatically opened to break the electrical contact between the input 53 and the output 54 of the switch whenever the pressure within the trailer emergency brake supply line 64 is above a predetermined pressure which is sufficient to release the emergency brakes of the trailer. When the pressure within the trailer emergency brake supply line 64 is above the predetermined pressure, the pneumatic switch is open, thereby terminating power to the auxiliary use 50 and ensuring a complete dedication of the ABS electrical input circuit 21 to the ABS control circuitry 42. Should the trailer be stopped and pressure released from the emergency brake system, the pressure within the emergency braking system 64 falls below the predetermined pressure and the normally closed contact 65 of the pneumatic switch 52 is closed to again permit auxiliary use of power from the ABS electrical supply circuit 21.

Figure 2:
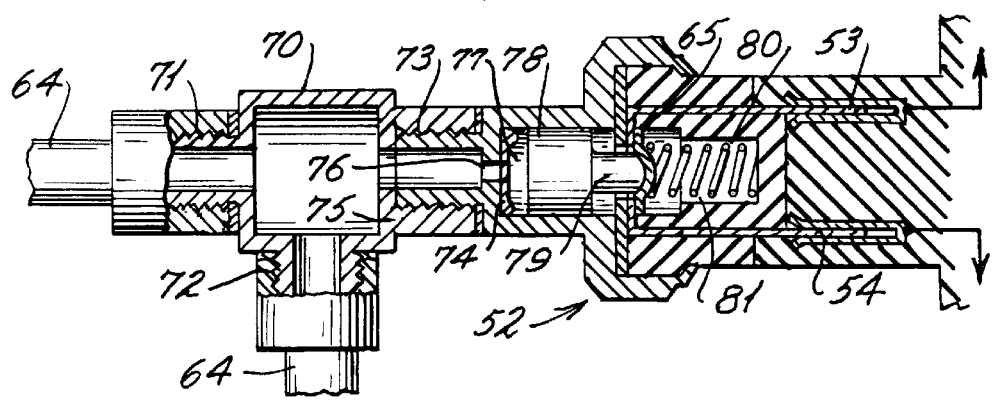
FIG. 2 is an enlarged cross-sectional view showing a pneumatic control switch used in accordance with the teachings of the present invention as it is tapped into the emergency brake air supply line between the tractor and the trailer shown in FIG. 1, wherein the switch is in a normally closed position allowing auxiliary power to be tapped from an electrical input circuit to the ABS control system.
Figure 3:
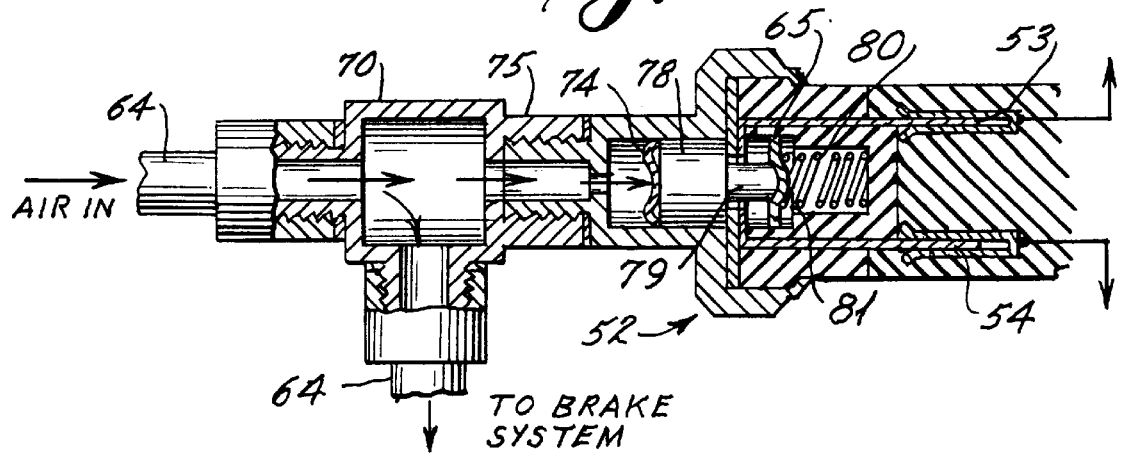
FIG. 3 is a cross-sectional view similar to FIG. 2 showing the opening of the pneumatic switch to terminate power through the auxiliary circuit connected to the electrical input to the ABS control system when sufficient pressure is available within the emergency braking system to release the trailer emergency brakes.

With particular reference to FIGS. 2 and 3, the pneumatic switch of the present invention is shown as being tapped to the emergency brake air supply line 64. It should be noted that tapping of the emergency brake air system may be accomplished at any point along the emergency braking system and the configuration shown in FIGS. 2 and 3 is for example only. A pneumatic tap 70 is provided for connecting separated portions of the emergency brake supply line 64. The connection between the tap 70 and the portions of the emergency brake supply line 64 may be accomplished by any manner which ensures that pressure is not lost through the connection. In the configuration shown in FIGS. 2 and 3, the tap 70 includes outwardly extending threaded nipples 71 and 72 which are designed to engage with cooperative threads provided on the separated portions of the emergency brake supply line 64 and a separate threaded nipple 73 which is threadingly engaged with the base 75 of the pneumatic switch 52. An air inlet opening 76 is provided in the base of the pneumatic switch 52 which communicates with chamber 77 in which is slidably mounted the body of a control piston 78. A seal 74 is provided at the base of the piston 78 to prevent air leakage. The piston 78 is connected to a protrusion 79 which is engageable with a U-shaped portion of the contact element 65 of the pneumatic switch. The contact element 65 is positively biased to a normally closed position by a spring element 80 which is mounted within an open cavity 81 formed in the body of the switch. The electrical input 53 and the electrical output 54 from the pneumatic switch are L-shaped so as to be engageable with the contact plate 65 whenever the pressure within the emergency brake supply line 64 is below the predetermined minimum necessary to release the emergency brakes of the trailer. However, when the pressure within the emergency brake supply line 64 is increased above the predetermined minimum which allows release of the trailer emergency brakes, the contact plate 65 is moved to the right, as shown in FIG. 3, thereby breaking contact with the base portion of each of the electrical input 53 and output 54, thus terminating power therethrough to the auxiliary load and ensuring a complete dedication of the ABS input circuit 21 to the ABS control circuit 42.

When the trailer is parked and pressure is depleted from the emergency brake supply line 64, the spring element 80 will automatically drive the electrical contact plate 65 of the pneumatic switch 52 to the closed position shown in FIG. 2, thus establishing a power circuit to an auxiliary load.

Utilizing the methodology of the present invention and the pneumatic switch and circuit, it is possible to ensure a failsafe manner of ensuring that a dedicated electrical circuit is provided at all times to the ABS control circuit of the trailer when the trailer is in motion. The method and apparatus, however, allow energy to be tapped from the ABS input circuit when it is not necessary by monitoring the condition of the emergency brake air supply system of the tractor-trailer vehicle.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A method of controlling electrical power through an ABS electrical circuit of a trailer which is electrically connected to receive electrical power from a designated electrical circuit of a tractor and which trailer is also pneumatically connected to receive emergency brake pressure through an emergency brake supply line connected to the emergency air brakes of the trailer, the method comprising the steps of:

a) sensing the pressure in the emergency brake supply line;
   b) electrically tapping the ABS electrical circuit to provide electrical power through the ABS electrical circuit to an auxiliary circuit whenever the emergency brake pressure is below a predetermined minimum at which the trailer's emergency air brakes would be released; and
   c) restoring full power through the ABS electrical input circuit in response to the emergency brake air supply pressure being above the predetermined minimum so that full power is supplied to the ABS control circuit whenever the trailer's air brakes are released by air pressure.

2. The method of claim 1 in which said step of electrically tapping includes connecting an auxiliary electrical supply line between the ABS electrical circuit and ground using a normally closed electrical switch.

3. The method of claim 2 wherein the step of sensing includes tapping the source of air pressure within the emergency brake supply line and connecting the pressure therein to the normally closed switch.

4. The method of claim 3 wherein the step of restoring includes opening the normally closed switch at pressures above the predetermined minimum to thereby open the pressure operated switch to terminate power to the auxiliary circuit.

5. The method of claim 1, including the additional step of connecting the ABS electrical circuit to a designated electrical brake light circuit from the tractor to the brake lights of the trailer to thereby provide a back-up power source to the ABS electrical circuit from the designated electrical brake light circuit whenever service brakes of the tractor are applied.

6. An apparatus for controlling electrical power through an ABS electrical circuit of a trailer which is electrically connected to receive electrical power from a designated electrical circuit from a tractor and which trailer is also pneumatically connected to receive emergency air brake pressure through an emergency brake supply line connected to the emergency air brakes of the trailer, the apparatus comprising:

an auxiliary electrical circuit connected between the ABS electrical circuit and an auxiliary point of use, said auxiliary electrical circuit including a switch having an electrical input and output, and means for opening said switch to prevent power from flowing from said input to said output in response to emergency air brake pressure being above a predetermined minimum.

7. The apparatus of claim 6 in which said switch is a pressure operated switch having normally closed input and output, and said means for opening includes a pressure supply line connecting said pressure operated switch to the emergency brake supply line.

8. The apparatus of claim 6, including means for connecting the ABS electrical circuit to a designated electrical brake light circuit extending from the tractor to the brake lights of the trailer whereby the ABS electrical circuit receives a back-up power source from the designated electrical brake light circuit whenever service brakes of the tractor are applied.

* * * * *